Figure 1:
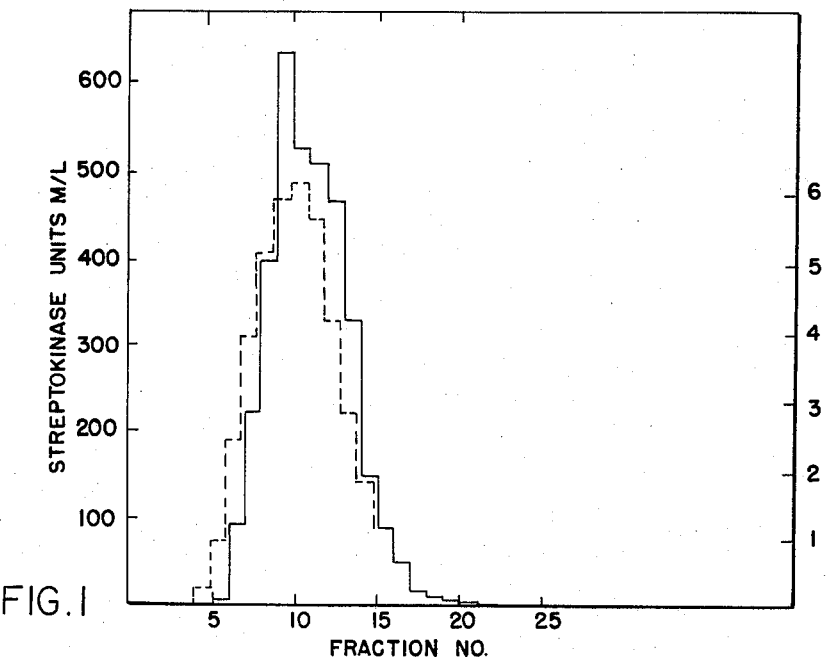
Figure 2:
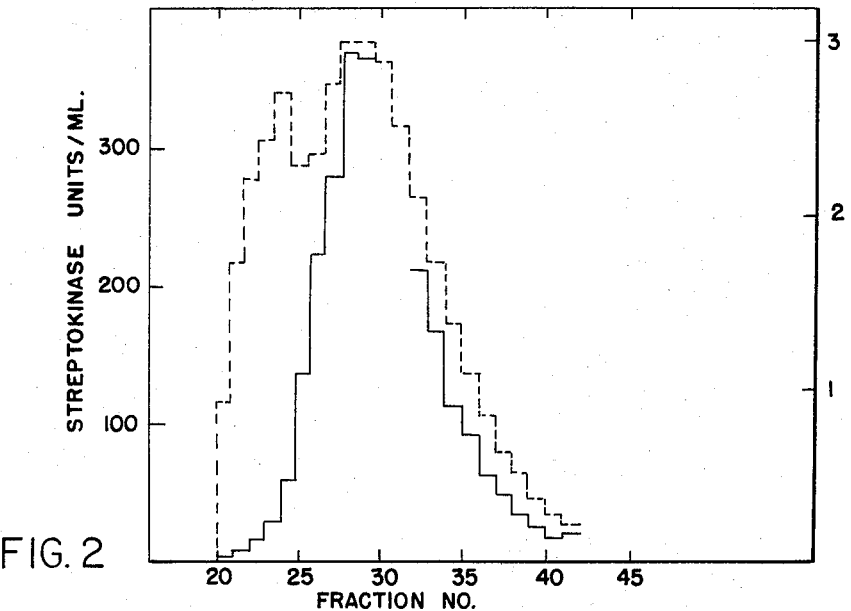

INVENTORS
ADALINE N. MATHER
ROBERT MAGUIRE

ATTORNEY

United States Patent Office 3,255,094
Patented June 7, 1966

3,255,094
METHOD FOR PURIFICATION OF STREPTOKINASE
Adaline N. Mather, Evanston, and Robert Maguire, Palatine, Ill., assignors to Baxter Laboratories, Inc., Morton Grove, Ill., a corporation of Delaware
Filed Jan. 10, 1963, Ser. No. 250,619
1 Claim. (Cl. 195—66)

The present invention relates to the purification of streptokinase.

Streptokinase is an enzyme produced as a fermentation product of various hemolytic streptococci. It is used medicinally, generally in combination with plasminogen to aid in the dissolution of blood clots and fibrin exudates. However, the use of streptokinase medicinally has been limited to a great extent due to the presence of pyrogenic contaminants.

The exact nature of these pyrogenic substances is not known and therefore the previous attempts to separate them from streptokinase have been varied, generally complex, and time consuming.

It is an object of the present invention to disclose a novel and simple method for removing pyrogenic contaminants from streptokinase.

It has now been discovered that the pyrogenic contaminants may be separated from streptokinase by column chromatography of solutions containing the contaminated streptokinase on gels formed from hydrophilic high molecular weight polymerization derivatives of dextran.

The dextran derivatives to be used in the present invention are those described in U.S. Patents Nos. 3,002,823 and 3,042,667. These dextran derivatives may be described as hydrophilic, insoluble, three-dimensional networks of polysaccharide chains prepared by cross-linking the polysaccharide dextran. The network is non-ionic and the porosity of the network is determined by the degree of cross-linkage. These dextran derivatives may be prepared by reacting dextran having an average molecular weight within the range of from 5,000 to 100,000 with epichlorohydrin in the presence of an alkaline catalyst. The resulting copolymerization gel product consists of a three-dimensional macroscopic network, built up of chains of mainly alpha-1,6-glycosidically bonded glucose residues bound together by ether bridges of the type

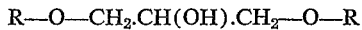
$$R\text{—}O\text{—}CH_2.CH(OH).CH_2\text{—}O\text{—}R$$

wherein R represents the dextran substances. The gel contains at least 15% hydroxyl groups by weight and has a water regain within the range of from 1 to 50 g./g. of the dry product.

The dextran derivatives contemplated for use in the present invention have the capability of completely excluding neutral polysaccharides having a molecular weight of at least 40,000 to 50,000. These dextran derivatives are commercially available under the trademark Sephadex 75 and 100 from Pharmacia Ltd. of Sweden.

In order to prepare the "gel" column which acts as a molecular sieve, the desired amount of the dextran derivative in granular form is allowed to swell in water until equilibrium is reached. It is then stirred to form a uniform suspension. The suspension is allowed to settle and the fines decanted. The process may then be repeated if desired.

The resulting suspension is then preferably poured into a glass chromatographic column. The column is washed extensively with the solvent which is to be used for the chromatography, for example, water, saline or buffer. The column is then drained to the upper level of the "gel" bed.

The solution containing the streptokinase and the pyrogenic contaminants is then pipetted carefully on to the surface of the column and flow through the column is commenced and so is the collection of 1.0 ml. fractions of eluate. Elution is contined until a volume equal to the total bed volume ($V_t$) of the column has been collected. The fractions collected are then assayed for streptokinase and pyrogen activity. The pyrogenic contaminants are found in first fractions after the void volume ($V_o$) of the column and are eluted completely within about one-third or less of the $V_t$. Completely non-pyrogenic streptokinase is found in the next 6 to 12 fractions.

The present method possesses the further advantage that the column may be used immediately for still another purification without prior treatment.

The method of the present invention may be employed to purify any crude streptokinase preparation, e.g., it can be used to remove the pyrogenic contaminants present in the crude streptokinase preparation obtained by the growth of *Streptococcus hemolyticus* under known conditions followed by filtration to remove the microorganism cells.

The practice of the present invention will be further illustrated by the following examples.

*Example 1*

6 grams of the previously described dextran polymer (Sephadex 75) were suspended in 400 ml. of pyrogen-free saline (0.9% NaCl). The suspension was stirred, allowed to settle and the fines decanted. This process was repeated twice. The resulting gel was packed in a 2 x 30 cm. glass chromatographic column. The column was washed intermittently for 2 days with pyrogen-free saline. The column was then drained until saline barely covered the upper level of the gel. The crude streptokinase solution (5 ml. of a 1% solution) was then pipetted on the surface of the column. Elution was commenced and 1.0 ml. fractions collected. Elution was continued until a volume equal to the total bed volume ($V_t$) of the column was collected. The fractions were assayed for streptokinase activity, optical density at 260 and 280 m$\mu$ determined and pyrogenicity evaluations performed on rabbits. Separation of streptokinase activity from substances absorbing at 280 m$\mu$ is illustrated in FIGURE I. The pyrogenic substances were found to be concentrated in the first fractions after the void volume ($V_o$) of the column and were eluted completely within about ⅓ of the $V_t$. Completely non-pyrogenic streptokinase was found in the next 6 to 8 fractions.

*Example 2*

4.5 grams of the dextran polymer (Sephadex 100) were suspended in 400 ml. of pyrogen-free normal saline (0.9% NaCl). The suspension was stirred and allowed to stand for 18 hours to hydrate the gel beads. Fines were decanted twice, and the resulting gel was packed in a 2 x 30 cm. glass chromatographic column. The column was allowed to settle for 24 hours, then washed with 500 ml. of pyrogen-free saline. Saline was drained to the gel surface, and 5 ml. of a 1% solution of crude streptokinase was pipetted on the surface of the column. After the sample had entered the bed, the surface was washed with pyrogen-free saline and elution continued with the same solvent. A volume equal to $V_t$ was collected in 1.0 ml. fractions. Samples were assayed as in Example 1 and results are illustrated in FIGURE II. The pyrogenic substances were concentrated in the first fractions after the $V_o$ volume, and were eluted completely within about 40% of the $V_t$. Completely non-pyrogenic streptokinase was found in the next 8 to 12 fractions.

*Example 3*

4.5 grams of the dextran polymer (Sephadex 100) were prepared and packed into a 4.4 x 30 cm. column, as described under Example 2. Ten ml. of a 1% solution of crude streptokinase was pipetted on the surface and eluted with pyrogen-free saline. A volume equal to $V_t$ was collected in 6.0 ml. fractions. The pyrogenic substances were concentrated in the first fractions after the $V_o$ volume, and were eluted completely within about the first 50% of the $V_t$. Completely non-pyrogenic streptokinase was recovered from the next 2 to 3 fractions.

It will be readily apparent to those skilled in the art that the present invention constitutes a superior method of purifying streptokinase. Furthermore, in view of what is known of the dextran derivatives ability to hold back the smaller molecular and to allow the larger molecular to pass through it has been established by the practice of the present invention that the pyrogenic contaminants are of larger molecular size than streptokinase.

What we claim is:

The method of purifying streptokinase which consists of passing a solution containing crude streptokinase and natural pyrogenic contaminants through a column of gel consisting of a dextran copolymersate built up of chains of mainly alpha-1,6-glycosidically bonded glucose residues and prepared by reacting dextran with epichlorohydrin in the presence of an alkaline catalyst, said gel containing at least 15% hydroxyl groups by weight and having a water regain within the range of from 1 to 50 grams/gram of the dry product, said gel having the capability of completely excluding neutral polysaccharides having a molecular weight of at least 40,000 to 50,000; discarding the first fractions of eluate which contain the pyrogenic contaminants and collecting the later fractions of eluate which contain the purified streptokinase.

References Cited by the Examiner

UNITED STATES PATENTS

| | | | |
|---|---|---|---|
| 2,997,425 | 8/1961 | Singher et al. | 195—66 |
| 3,002,823 | 10/1961 | Flodin et al. | 195—66 |
| 3,107,203 | 10/1963 | Baumgarten et al. | 195—66 |

A. LOUIS MONACELL, *Primary Examiner.*

L. M. SHAPIRO, *Assistant Examiner.*